United States Patent [19]

Jones

[11] Patent Number: 5,265,942

[45] Date of Patent: * Nov. 30, 1993

[54] VARIABLE RESPONSE FLUID BRAKE SYSTEM REGULATORS

[76] Inventor: Ed F. Jones, P.O. Box 9880, Spokane, Wash. 99209

[ * ] Notice: The portion of the term of this patent subsequent to Dec. 24, 2008 has been disclaimed.

[21] Appl. No.: 805,851

[22] Filed: Dec. 10, 1991

Related U.S. Application Data

[63] Continuation of Ser. No. 491,706, Mar. 12, 1990, Pat. No. 5,074,625.

[51] Int. Cl.$^5$ .................... B60T 17/00; F16L 55/04
[52] U.S. Cl. ..................... 303/87; 137/568; 137/593; 138/30
[58] Field of Search ............. 303/87; 138/26, 30, 138/31; 60/413, 415; 188/152, 298; 267/64.27, 64.28, 122, 64.11; 137/593, 568

[56] References Cited

U.S. PATENT DOCUMENTS

| | | | |
|---|---|---|---|
| 2,474,512 | 6/1949 | Bechtold et al. | 138/30 |
| 2,808,070 | 10/1957 | Malsbary | 138/30 X |
| 2,828,769 | 4/1958 | Cooper | 138/30 |
| 2,880,759 | 4/1959 | Wisman | 138/30 |
| 2,968,319 | 1/1961 | Ball | 138/30 |
| 2,999,681 | 9/1961 | Müller et al. | 267/64.27 |
| 3,378,036 | 4/1968 | Clayton | 138/30 |
| 3,428,091 | 2/1969 | Sugimura et al. | 138/30 |
| 3,430,660 | 3/1969 | Mitton | 138/30 |
| 3,433,330 | 3/1969 | Murray | 303/87 |
| 3,482,828 | 12/1969 | Niada | 267/64.27 X |
| 3,529,872 | 9/1970 | Mitton | 303/24 |
| 3,556,159 | 1/1971 | Bleasdale | 138/30 |
| 3,593,748 | 7/1971 | Teerling | 267/64.27 X |
| 3,612,105 | 10/1971 | Martin | 138/30 |
| 3,757,825 | 9/1973 | Givens et al. | 138/26 |
| 4,092,017 | 5/1978 | Urushiyama et al. | 267/64.27 X |
| 4,166,655 | 9/1979 | Spero | 303/87 |
| 4,188,073 | 2/1980 | Ishikawa et al. | 303/87 |
| 4,220,376 | 9/1980 | Spero | 303/87 |
| 4,234,172 | 11/1980 | Takahashi | 267/122 X |
| 4,571,009 | 2/1986 | Jones | 303/87 |
| 4,826,045 | 5/1989 | Price et al. | 138/30 |
| 4,828,234 | 5/1989 | Hoying et al. | 267/64.28 X |
| 5,074,625 | 12/1991 | Jones | 303/87 |
| 5,078,455 | 1/1992 | Washington | 303/87 X |

FOREIGN PATENT DOCUMENTS

| | | | |
|---|---|---|---|
| 248770 | 5/1963 | Australia | 138/30 |
| 449469 | 6/1948 | Canada | 138/30 |
| 0215296 | 3/1987 | European Pat. Off. | 138/30 |
| 1101067 | 3/1961 | Fed. Rep. of Germany | 138/26 |
| 1373140 | 8/1963 | France . | |
| 0155345 | 12/1979 | Japan | 267/64.27 |
| 911265 | 11/1962 | United Kingdom . | |
| 1089667 | 11/1967 | United Kingdom | 138/30 |
| 1412253 | 10/1975 | United Kingdom | 138/30 |

OTHER PUBLICATIONS

Publication by "Greer Hydraulics, Inc.", 454 18th St. Brooklyn 15, New York, Accumulators For Industry (eight pages), Mar. 27, 1947.

"AccuGlide Taping Heads from 3M", 3M Packaging Systems, a Division of 3M Corporation (1990) product brochure.

*Primary Examiner*—Douglas C. Butler
*Attorney, Agent, or Firm*—Wells, St. John, Roberts, Gregory & Matkin

[57] ABSTRACT

Disclosed is a regulator for use in fluid braking systems of motor vehicles, particularly hydraulic braking systems. The regulator includes a housing which is advantageously formed of a main housing piece and a detachable cap piece. A resilient bulb is mounted within the housing, such as between the main piece and cap. The housing includes a bulb cavity in which expandable portions of the resilient bulb are mounted. The bulb cavity is larger than the resilient bulb so that increased braking pressures applied by the braking system to the interior of the bulb cause the bulb to expand outwardly within the cavity. The space between the interior surfaces of the cavity and the outer surfaces of the bulb define a bulb restraint chamber. The housing is preferably provided with a restraint pressure supply which allows a desired, elevated restraint pressure to be established within the restraint chamber. The bulb restraint chamber is advantageously provided with a restraint member which is preferably elastic and mounted to the interior surfaces of the bulb cavity so as to extend inwardly. The restraint member is positioned to engage the bulb within a medial band. The restraint member provides decreasing responsiveness of the bulb as braking pressure increases but increases responsiveness at high pressures which would otherwise fully expand the bulb. This and the pressurized restraint chamber provide improved operation over a wide range of braking pressures.

26 Claims, 2 Drawing Sheets

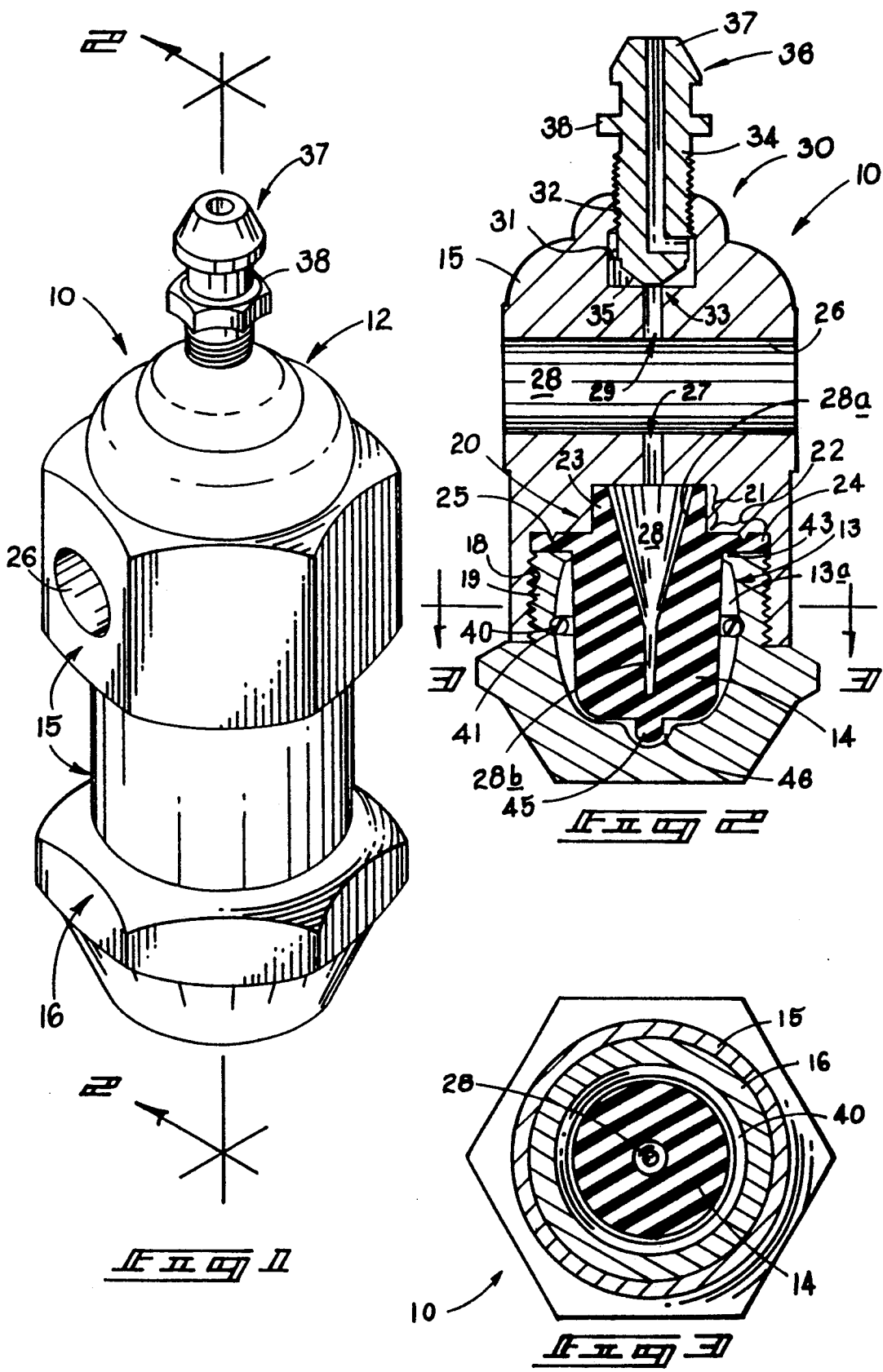

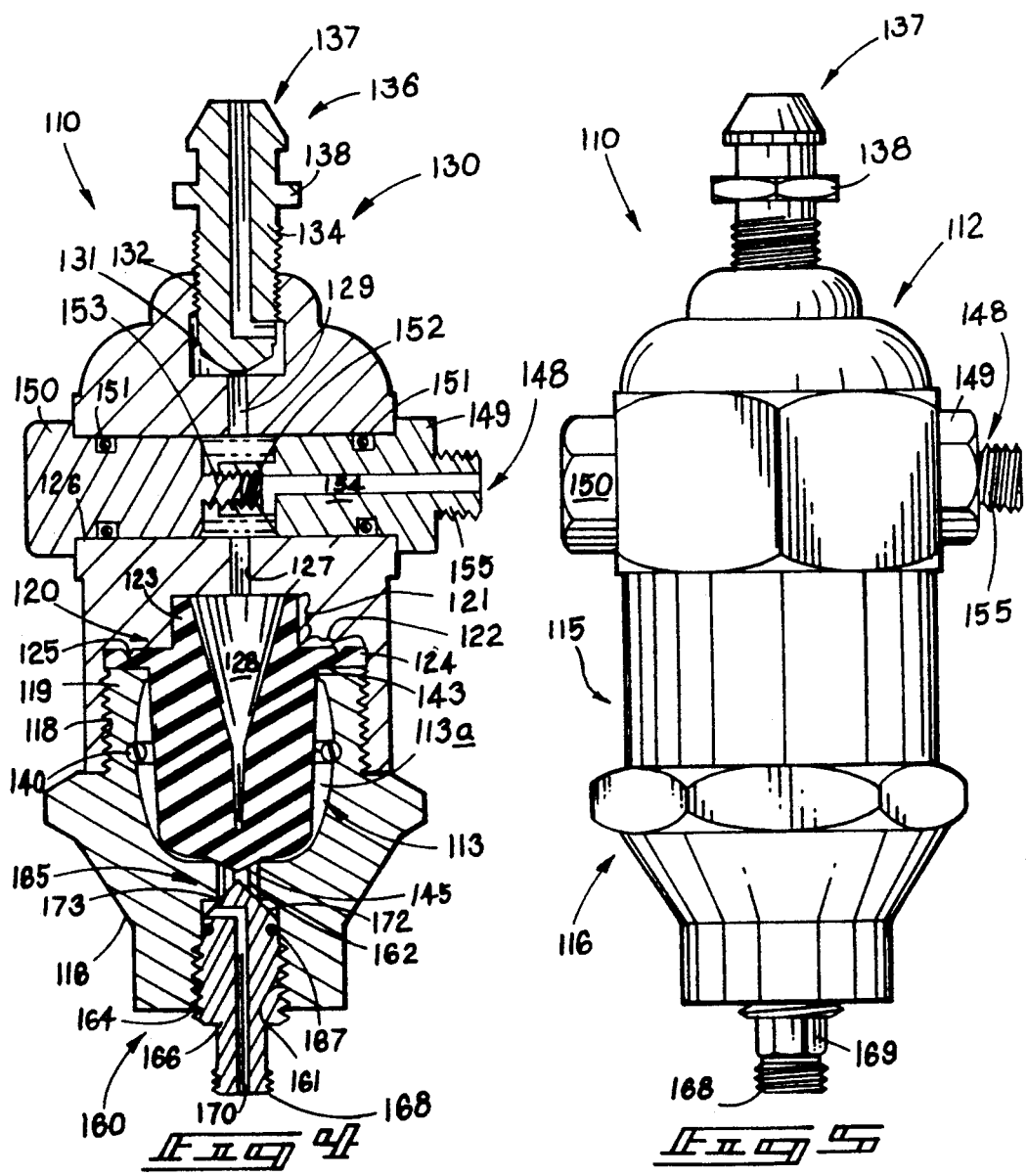

VARIABLE RESPONSE FLUID BRAKE SYSTEM REGULATORS

CROSS-REFERENCE TO RELATED APPLICATION

This is a continuation of application Ser. No. 07/491,706 filed Mar. 12, 1990 now U.S. Pat. No. 5,074,625.

TECHNICAL FIELD

The technical field of this invention is pressure equalizers and regulators for fluid actuated brake systems.

BACKGROUND OF THE INVENTION

Fluid brake systems are used on automobiles, trucks, and other vehicles. In such systems there are typically either brake shoes or brake calipers which engage a brake drum or brake disc. Brake drums and discs are subjected to high forces which cause distortion and resulting lack of circularity. When this happens the brake shoes or discs are less able to effectively brake because they tend to hop or skip off of the high points of the distorted brake drum or disc.

It has been previously known that an accumulator or pressure equalizing device can be used for reducing pressure surges in hydraulic braking systems. Such devices also help to equalize the pressure experienced by each brake cylinder. U.S. Pat. No. 3,430,660 to Mitton shows a pressure equalizing apparatus. U.S. Pat. No. 4,571,009 to Jones, the current inventor, also shows another pressure equalizing apparatus. Both of these equalizers have a resilient bulb which is held within a housing. The bulb is contained within a concave cavity which allows the side walls of the bulb to flex outwardly when increased braking pressures are applied to the interior of the resilient bulb.

Both of these prior art brake system equalizers have been found by the inventor to suffer from response deficiencies. Under harder braking conditions high pressures are developed in the braking system. It has been discovered that such high braking pressures can cause the flexible bulb to fully expand within the chamber of the equalizer. This greatly reduces or effectively eliminates proper operation during extreme braking conditions. Attempts to increase high pressure responsiveness have lead to relatively poor response characteristics under medium and light braking conditions.

Light braking conditions have a substantial need for brake equalization and suppression of pressure waves developed due to brake eccentricities. Light braking becomes particularly important with respect to rain slickened and snow covered roads. Under these conditions the eccentricities of the braking components can have a dramatic effect on braking effectiveness because the forces developed between the roadway and wheel are reduced. The eccentricities can therefore more easily cause wheel lockup and the resulting skidding and loss of vehicle control.

The prior art brake equalizers have also suffered from difficulties associated with variations in brake systems from one type of vehicle to another. In some vehicles the addition of a brake system equalizer has caused undesired softness in the apparent braking force applied by the driver. The same or similar unit installed in another car might perform optimally. The utilization of a single type of brake system equalizer has thus been a compromise which provide less than optimum performance for at least some vehicles. Customization of brake equalizers has not been practical because of the lack of knowledge of the variable parameters causing the changes and the increased costs in inventory, manufacturing and installation.

Thus there remains a substantial need in the art of fluid brake systems for an equalizer or accumulator which is appropriately responsive at low, medium and high braking pressures associated with varying operator pedal pressures and stopping requirements. There is also a continuing need for effective braking system equalization under varying road conditions which experience varying amounts of braking force developed between the wheel and road. There also remains a strong need for a pressure equalizing and wave suppressing accumulator which is suitable for use on a range of vehicle types and sizes.

BRIEF DESCRIPTION OF THE DRAWINGS

Preferred embodiments of the invention are illustrated in the accompanying drawings which are briefly described below.

FIG. 1 is a perspective view showing a preferred brake system regulator according to this invention.

FIG. 2 is a longitudinal sectional view taken along line 2—2 of FIG. 1.

FIG. 3 is a cross-sectional view taken along line 3—3 of FIG. 2.

FIG. 4 is a longitudinal sectional view similar to FIG. 2 of an alternative embodiment regulator of this invention.

FIG. 5 is a front elevational view of the regulator of FIG. 4.

DETAILED DESCRIPTION OF THE PREFERRED EMBODIMENTS

This disclosure of the invention is submitted in furtherance of the constitutional purposes of the Patent Laws "to promote the progress of science and useful arts" (Article 1, Section 8).

FIGS. 1-3 show a preferred brake system regulator 10 according to this invention. Regulator 10 includes a housing 12 which defines and encloses a resilient bulb cavity 13. A resilient bulb 14 is mounted within the resilient bulb cavity 13 in a manner which allows the bulb to expand and contract in response to varying brake line pressure.

The housing 12 is preferably constructed in two parts, a first or main housing piece 15, and a second or housing cap piece 16. The first and second housing pieces are advantageously adapted for detachable connection. As shown, main housing piece 15 is provided with a cap receptacle 18 which is provided with internal threads along the side walls of the receptacle. The cap is correspondingly provided with a connection part 19 which has external threads thereon along the sidewalls which mate with the internal threads within the cap receptacle.

The inward recessed end 20 of the cap receptacle 18 includes two regions, a cup region 21 and a flange region 22. These regions are designed to receive a bonnet portion 23 and a flange 24 of the resilient bulb 13, respectively. The face of the flange region is transverse to the longitudinal axis of the regulator and includes a sealing ridge 25 which bears upon the flange 24 of the resilient bulb and provides increased sealing force along a circumferential line of effective contact. The opposite side of flange 24 is held by the end face of the cap 16.

The main part of the housing is also preferably provided with one or more brake fluid communication passageways through which the brake fluid pressure is communicated to the interior of resilient bulb 14. Housing part 15 includes a through bore passageway 26 which is adapted to receive a connection fitting, such as shown and described in connection with the alternative embodiment of FIG. 4 below. The through bore 26 functions as a primary brake fluid communication passageway. A secondary branch passageway 27 is in fluid communication with primary passageway 26 and extends to the central portion of the cup region 21 at the recessed end of cap receptacle 18. The secondary branch 27 is in fluid communication with an interior chamber 28 of the resilient bulb 14. Fluid pressure changes which occur in the brake system of a vehicle are communicated by pressure waves which typically travel throughout the braking system. These pressure changes and associated pressure waves are also communicated to the interior chamber 28 through the brake fluid communication passageways 26 and 27 formed through the housing.

Housing main part 15 is also advantageously provided with a tertiary branch passageway 29 which is in fluid communication with a bleed port 30. The bleed port is designed to assist in the removal of any air from a hydraulic brake system. The bleed port is advantageously constructed with a bleed port receptacle 31. The outer portion of the bleed port receptacle is provided with a suitable valve connection, such as the internal threads 32 shown. The bleed port receptacle is adapted to form a bleed valve 33 with the internal end of a bleed port fitting 34. The tapered internal end 35 of the bleed port fitting engages the edge of the tertiary passageway 29 to provide a circular seal between the housing and the fitting 34.

The bleed port fitting is advantageously provided with an outer connection end 36 which is provided with a hose connection fitting 37. The connection fitting allows a bleed hose to be connected thereon so that air can be purged from the brake system with the bleed hose held in a container of brake fluid to prevent reentry of air. The central portion of the bleed port fitting is provided with external threads which are received within the internal threads of the bleed port receptacle. A wrench engagement nut 38 is also formed on the exposed portions of the bleed port fitting to facilitate rotation for tightening and loosening of the bleed port fitting. This action controls the bleed valve 33 into closed and open positions.

The second or cap part 16 of the housing serves to principally define the bulb cavity 13. The bulb cavity is substantially concave and rounded and shaped in a configuration which corresponds to the expanded shape of the resilient bulb to provide support to the bulb against explosion or plastic deformation. In cross-section the bulb and cavity are circular, as shown in FIG. 3. The cavity 13 is defined by interior cavity surfaces which are spaced from the outer surfaces of the bulb when the bulb is in a relaxed or internally unpressurized state at or near atmospheric pressure. The space between the bulb and cavity interior walls is referred to as the restraint chamber 13a. The mouth of the cavity is provided with a sealing bead 43 which extends radially inward and engages the bulb adjacent to flange 24. The sealing bead restricts the portion of the bulb which can expand in response to braking pressure.

The bulb cavity 13 is preferably adapted to provide a bulb restraint member 40. Bulb restraint member 40 is preferably an elastic member received within a bulb restraint member groove 41 formed in the interior sidewall of the bulb receiving cavity 13. It is preferred that the restraint member be located within a medial band about the expandable portion of the bulb. The groove 41 and restraint member 40 are most appropriately located within a medial band equal in width to about 20 percent of the unsupported axial length of the expandable portion of the bulb in its relaxed state. This 20 percent band is preferably centered at the median of the unsupported length of the expandable portion of the bulb in its relaxed state. This provides an approximately ±10 percent length medial band about the median of the unsupported length of the expandable portion of the bulb.

The resilient bulb 14 includes an expandable portion which is defined as the distal portion from the sealing bead 43 (or approximately from flange 24) downward as shown in FIG. 2. The outer sidewalls of the expandable portion of the bulb are advantageously tapered converging at a gentle angle of approximately 1°-5° toward the distal end. The very distal end of bulb 14 can be provided with a point 45 which helps to locate the bulb relative to the bulb cavity within a point cup 46.

The interior chamber 28 of the bulb is advantageously formed to have an outer or first portion 28a which is funnel shaped. Chamber 28 also advantageously includes a relatively narrow second or inward dead end portion 28b. The funnel portion converges inwardly from an interior chamber mouth at the top of the bulb bonnet 23. The bulb interior chamber mouth is relatively wide compared to remaining portions of the interior chamber. Typically the mouth of the interior chamber is more than half the maximum width or diameter of the bulb bonnet 23. This facilitates communication of pressure waves into and through the interior chamber and increases the responsiveness of the unit.

The exterior surfaces of the bulb expandable portion are preferably spaced from the interior surfaces of the bulb cavity 13 and from the inward surfaces of the bulb restraint member 40. This spacing of the bulb walls provides relatively sensitive response at lower braking pressures because the bulb is free to expand outwardly within the cavity 13, subject only to the restraining pressure existing in the restraint chamber 13a. After braking pressures have reached a higher level then the expansion of the bulb causes the bulb sidewalls to impinge upon the restraint member 40 and interior surfaces of the cavity thus decreasing the responsiveness of bulb expansion to increasing pressure. Thus the regulator 10 automatically changes to become less sensitive at higher braking pressures. The sensitivity continues to decrease as the bulb becomes more fully compressed against the restraint member 40. As the bulb further expands against the restraint member 40 it also contacts the interior surfaces of the cavity in a progressive manner from the ends of the expandable portion toward the medial restraint member. This operation causes the responsiveness of the bulb to increasing pressure to decrease at an increasing rate of change. This variable response characteristic of the novel regulators of this invention is significant in providing improved braking performance over a range of braking pressures, including even very hard braking pressures which sometimes approach 1000 psig.

The flexible restraint member 40 preferred in this invention provides a significant amount of additional flexibility as the bulb expands to contact the surfaces of the cavity. The resiliency of restraint member 40 allows the responsiveness of the bulb to increasing pressure to be maintained to a sufficient degree during medium to hard braking pressures. Since this is the normal operating range for braking which is noticed by a driver, the performance of the regulator is thus improved. Upon reaching high braking pressures during fast or emergency stops the bulb expands to contact a large part of the cavity interior walls thereby achieving even further reductions in responsiveness. The resiliency of the bulb walls and remaining deformation of the bulb over the restraint member provide the highest levels of resistance and lowest levels of bulb response for a given change in pressure.

FIG. 4 shows a further preferred embodiment of brake system regulator 110 according to this invention. Regulator 110 is similar to regulator 10 described above. Reference numerals used in FIG. 4 correspond with reference numerals used in FIGS. 1-3 except that the numbers are preceded by an additional 1, e.g. 110 versus 10. The description given hereinabove with respect to regulator 10 thus applies to the same extent as the similarities between FIGS. 1 and 4. Differences between the embodiments of FIGS. 1 and 4 will be described below.

FIG. 4 additionally shows a suitable brake line connection fitting 148. Brake line connection fitting 148 can be selected from a variety of suitable devices, or alternatively, the passageway 126 can be threaded or otherwise suitably adapted to connect a brake line conduit (not shown) thereto. As shown, brake line connection fitting 148 includes two complementary parts 149 and 150. Parts 149 and 150 are installed into opposite sides of through bore 126. O-rings 151 seal to the through bore at both ends. Parts 149 and 150 are suitably adapted to connect together near the middle of the through bore, such as by interconnection of corresponding threaded portions 152 and 153. A brake fluid communicating passageway 154 extends from a threaded connection nipple 155 to the middle portion of the through bore to provide fluid communication with passageways 127 and 129.

The main housing 115 of regulator 110 is the same as main housing 15 described above. The second or cap part 116 is similar to cap 16 except that the distal portions of the cap are longer and provided with a restraint pressure supply 160 which allows precharging of the bulb restraint chamber 113a to a desired elevated restraint pressure. Restraint pressure supply 160 includes a bulb restraint pressure supply port 161 which is formed in the distal end of housing cap 116. The pressure supply port 161 is connected by a bulb restraint pressure supply receptacle 164 and pressure supply passageway 162 to provide fluid communication with the resilient bulb cavity 113 and restraint chamber 113a. The pressure within chamber 113a and about resilient bulb 114 is established at a desired level using the restraint pressure supply 160.

The restraint pressure supply 160 also preferably includes a restraint pressure supply control valve 165. Control valve 165 is advantageously formed by an internal end of a restraint pressure supply fitting 166. Fitting 166 is mounted within the pressure supply receptacle 164 using corresponding threads formed in the receptacle and on the fitting. A valve isolation seal 167 extends about the fitting piece to seal the valve from the threaded portions of the fitting. The fitting is provided with a pressure connection nipple 168 which is preferably threaded to allow connection of a pressure supply line (not shown). A nut portion 169 is provided to facilitate movement of the fitting piece 166 by rotation and corresponding axial movement due to the threaded connection. A pressure supply fitting feed passageway 170 is formed through the fitting piece from the connection nipple 168 to the inward side of the O-ring seal 167. The inward end of titting piece 166 is provided with a valve sealing cone 172 which seals about a circular line of sealing contact against a valve seat 173 formed by a shoulder formed in the housing cap 116.

It should also be understood that the preferred construction shown for the pressure supply 160 is not the only suitable construction within the invention. Other control valves which utilize automatically operated check valves may alternatively be suitable if adequate pressure sealing ability is provided.

FIG. 4 also shows an alternative construction for the resilient bulb point. Bulb point 145 is shaped as a cone or alternatively as a frusto-cone. The tapered conical surface of point 145 is positioned sufficiently close to the opening of passageway 162 into cavity 113 so that pressure applied to the interior of bulb 113 causes sealing to occur. Pressure charged into the chamber 113a will also cause deformation of the bulb sidewalls which elongates the expandable portion of the bulb and can effectuate sealing after the pre-charge has been made. This alternative construction can assist in preventing leakage of an elevated restraint pressure established within the bulb restraint chamber 113a.

As shown in FIG. 4 valve 165 is closed. The fitting piece 166 is extended by appropriately rotating the piece to thus cause the valve seal formed by valve cone 172 and seat 173 to open. Pressurized compressible fluid is charged into bulb cavity 113 about the resilient bulb 114 by passing the fluid through passageways 170 and 162. A variety of suitable gases such as air, nitrogen, $CO_2$, refrigerants and others may be suitable for precharging the restraint chamber with a restraining pressure. Dense gases are particularly appropriate if their other properties are suitable for the expected temperature ranges experienced. When the desired initial bulb restraint pressure has been established about the bulb then the fitting piece is rotated inwardly to close the valve 165.

The desired initial bulb restraint operating pressure is preferably in the range in excess of 100 pounds per square inch gauge (psig). More preferably pressures above approximately 150 psig provide improved response characteristics, particularly in the medium range of braking pressures at which most vehicular braking occurs. Even more preferably the desired restraint chamber pressures are in the approximate range 150-300 psig. Still more preferably the desired initial bulb restraint operating pressures are in the approximate range 200-300 psig. All of these indicated pressures are for novel brake regulators which are not pressurized within the interior chamber of the resilient bulbs.

The regulators 10, 110 and others in accordance with this invention are used by connecting the brake line connection fitting 155 to the brake fluid system of a vehicle to provide fluid communication therewith. This is advantageously done at or near the master cylinder of a hydraulic brake system using a tee fitting placed in the output lines from the master cylinder. The regulators can alternatively be placed at other suitable locations in the brake system.

The regulators of this invention operate in response to changes of brake fluid pressure. An increase in brake fluid pressure causes a small inflow of brake fluid into the interior chamber 28. The pressure increase and associate flow causes the resilient bulb to expand thus increasing the volume of the interior chamber 28. The pressure within the surrounding restraint chamber produces an initial responsiveness which requires some degree of pedal pressure before operation of the bulb effectively commences. The elevated restraint pressures achievable in chamber 113a reduce or eliminate pedal softness experienced on some vehicles installed with the prior art equalizers. Once the brake pressure within the interior chamber exceeds the pressure within the restraint chamber, then the bulb begins to expand in response to braking pressure increases or dynamic fluctuations. The preferred elevated pressures which can be established within restraint chamber 113a of regulator 110 provide a relatively less responsive operation at lower braking pressures. However, the elevated pressures provide improved response throughout a larger range of braking pressures. The elevated pressures also increase the brake fluid pressure needed to cause contact between the bulb outer surfaces and the bulb restraint members 40 and 140. The elevated restraint pressures extend the upper range of braking pressures which are appropriately regulated.

After the brake fluid pressure has increased to a sufficient degree that the resilient bulb contacts the bulb restraint member, then a higher rate of pressure increase is needed to produce expansion of the interior volume of bulb interior chamber. The circular sectional shape of the preferred annular O-ring provides an increasing resistance to bulb expansion as the bulb expands outwardly. As the O-ring compresses and the bulb expands further the rate of resistance to further bulb expansion increases further. This arrangement thus provides a automatically increasing resistance rate to bulb expansion which provides superior regulator performance at higher brake fluid pressures. This novel construction provides superior performance as compared to prior art devices which tended to expand fully and thus become unresponsive to pressure fluctuations at high braking pressures. This loss of effective operation has occurred when wheel lockup is most probable and equalization between the various wheels is most urgently needed to maintain better control during hard braking.

The regulators of this invention are made using conventional metal working techniques, such as machining, molding or otherwise forming the regulator components as shown and described. The housing is preferably made of aluminm or other metal compatible with the brake fluid being used. The resilient bulb is preferably make from butyl synthetic rubber or some other resilient material. A durometer hardness in the range of 60 to 85 is preferred, even more preferably 70–80 durometer.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A brake system pressure regulator for use in hydraulic brake systems to equalize and regulate brake fluid hydraulic pressures experienced therein, comprising:
   a housing;
   a cavity substantially enclosed within the housing;
   at least one brake fluid communication passageway formed through said housing;
   a resilient deformable member mounted within said housing for expansion and contraction relative to said cavity in response to increasing and decreasing brake fluid pressure applied against said resilient deformable member through said at least one brake fluid communication passageway; said resilient deformable member being constructed to separate said cavity into an interior chamber supplied with brake fluid from a restrain chamber containing a compressible gas;
   at least one restraint member positioned within the restraint chamber; said at least one restraint member being made of a compressible elastic material to elastically restrain the resilient deformable member as the resilient deformable member expands in response to increased brake fluid pressure applied through said at least one brake fluid communication passageway. one brake fluid communication passageway.

2. A brake system regulator according to claim 1 wherein said at least one restraint member is mounted within a groove formed along interior surfaces of the housing adjacent the cavity.

3. A brake system regulator according to claim 1 wherein said at least one restraint member is an annular member mounted within a groove formed along interior surfaces of the housing adjacent the cavity.

4. A brake system regulator according to claim 1 wherein said resilient deformable member is a resilient bulb.

5. A brake system regulator according to claim 1 wherein said at least one restraint member is spaced from said resilient deformable member when the brake fluid pressure is at approximately atmospheric pressure.

6. A brake system regulator according to claim 1 wherein said at least one restraint member is spaced from said resilient deformable member when the brake fluid pressure is at approximately atmospheric pressure to thereby allow some free expansion of the resilient deformable member in response to increased brake fluid pressure before contact with said at least one restraint member.

7. A brake system regulator according to claim 1 wherein said at least one restraint member includes a convex surface against which the resilient deformable member contacts when sufficiently expanded by brake fluid pressure.

8. A brake system regulator according to claim 1 wherein said at least one restraint member has an annular surface against which the resilient deformable member contacts when sufficiently expanded by brake fluid pressure.

9. A brake system regulator according to claim 1 wherein said at least one restraint member has an annular convex surface against which the resilient deformable member contacts when sufficiently expanded by brake fluid pressure.

10. A brake system regulator according to claim 1 wherein said at least one restraint member includes a circular annular member.

11. A brake system regulator according to claim 1 wherein said at least one restraint member includes a circular annular member having a convex surface against which the resilient deformable member contacts when sufficiently expanded by brake fluid pressure.

12. A brake system regulator according to claim 1 wherein said at least one restraint member is positioned to be engaged by medial portions of the resilient deformable member.

13. A brake system regulator according to claim 1 wherein said at least one restraint member is positioned to be engaged by a medial band of the resilient deformable member.

14. A brake system pressure regulator for use in hydraulic brake systems to equalize and regulate brake fluid hydraulic pressures experienced therein, comprising:
  a housing;
  a cavity substantially enclosed within the housing;
  at least one brake fluid communication passageway formed through said housing;
  a resilient deformable member mounted within said housing for expansion and contraction relative to said cavity in response to increasing and decreasing brake fluid pressure applied against said resilient deformable member through said at least one brake fluid communication passageway; said resilient deformable member being constructed to separate said cavity into an interior chamber supplied with brake fluid from a restrain chamber containing a compressible gas;
  at least one restraint member receptacle formed along interior sidewall surfaces of said cavity within the restraint chamber;
  at least one restraint member positioned within said restraint member receptacle; said at least one restraint member being positioned relative to the expandable surfaces of the resilient deformable member to restrain the resilient deformable member as the resilient deformable member expands in response to increased brake fluid pressure applied through said at least one brake fluid communication passageway.

15. A brake system regulator according to claim 14 wherein said at least one restraint member receptacle is a groove formed along said interior sidewall surfaces of the cavity.

16. A brake system regulator according to claim 14 wherein said at least one restraint member receptacle is a groove formed along said interior sidewall surfaces of the cavity; said groove being semicircular for receiving a portion of said at least one restraint member which is semi-circular in cross-sectional shape.

17. A brake system regulator according to claim 14 wherein said at least one restraint member receptacle is a groove formed along said interior sidewall surfaces of the cavity; said groove being semicircular for receiving an O-ring having a circular cross-sectional shape.

18. A brake system regulator according to claim 14 wherein said at least one restraint member receptacle is a groove formed along said interior sidewall surfaces of the cavity; and wherein said at least one restraint member is an annular member mounted within said at least one restraint member receptacle.

19. A brake system regulator according to claim 14 wherein said resilient deformable member is a resilient bulb.

20. A brake system regulator according to claim 14 wherein said at least one restraint member is spaced from said resilient deformable member when the brake fluid pressure is at approximately atmospheric pressure.

21. A brake system regulator according to claim 14 wherein said at least one restraint member is spaced from said resilient deformable member when the brake fluid pressure is at approximately atmospheric pressure to thereby allow some free expansion of the resilient deformable member in response to increased brake fluid pressure before contact with said at least one restraint member.

22. A brake system regulator according to claim 14 wherein said at least one restraint member includes a convex surface against which the resilient deformable member contacts when sufficiently expanded by brake fluid pressure.

23. A brake system regulator according to claim 14 wherein said at least one restraint member has an annular surface against which the resilient deformable member contacts when sufficiently expanded by brake fluid pressure.

24. A brake system regulator according to claim 14 wherein said at least one restraint member has an annular convex surface against which the resilient deformable member contacts when sufficiently expanded by brake fluid pressure.

25. A brake system regulator according to claim 14 wherein said at least one restraint member includes a circular annular member.

26. A brake system regulator according to claim 14 wherein said at least one restraint member includes a circular annular member having a convex surface against which the resilient deformable member contacts when sufficiently expanded by brake fluid pressure.

* * * * *